United States Patent [19]
Küffer

[11] Patent Number: 5,439,619
[45] Date of Patent: Aug. 8, 1995

[54] STEAM CONDITIONING BUTTERFLY VALVE

[75] Inventor: Max Küffer, Blue Bell, Pa.

[73] Assignee: Keystone International Holdings Corp., Wilmington, Del.

[21] Appl. No.: 164,371

[22] Filed: Dec. 9, 1993

[51] Int. Cl.⁶ ............................................. B01F 3/04
[52] U.S. Cl. ............................... 261/41.4; 261/44.2; 261/44.6; 261/DIG. 13
[58] Field of Search ............ 261/41.4, DIG. 13, 44.2, 261/44.6

[56]   References Cited

U.S. PATENT DOCUMENTS

| | | | |
|---|---|---|---|
| 1,120,183 | 12/1914 | Duff | 261/41.4 |
| 1,269,177 | 6/1918 | Gilles | 261/44.2 |
| 1,832,652 | 11/1931 | Peebles | 261/DIG. 13 |
| 2,617,638 | 11/1952 | Udale | 261/44.2 |
| 2,776,821 | 1/1957 | Davis | 261/44.2 |
| 2,995,349 | 8/1961 | Kennedy, Sr. | 261/44.2 |
| 3,202,404 | 8/1965 | Brandwood et al. | 261/44.2 |
| 3,266,785 | 8/1966 | Kennedy, Sr. | 261/44.2 |
| 3,331,590 | 7/1967 | Battenfeld et al. | 261/DIG. 13 |
| 4,079,718 | 3/1978 | Holzbaur | 261/44.2 |
| 4,130,611 | 12/1978 | Brand | 261/DIG. 13 |

FOREIGN PATENT DOCUMENTS

| | | | |
|---|---|---|---|
| 611784 | 10/1926 | France | 261/44.2 |
| 29834 | 12/1911 | United Kingdom | 261/44.2 |

*Primary Examiner*—Tim R. Miles
*Attorney, Agent, or Firm*—John W. Logan, Jr.

[57]   ABSTRACT

The present invention is a steam conditioning valve for use in simultaneously reducing temperature and pressure in a superheated steam line. The invention provides a butterfly-type valve with desuperheating water nozzles oriented on its downstream face. In the preferred embodiment illustrated, valving is included to control the flow of water to each of the nozzles selectively. The present invention provides an improved steam conditioning valve which is both simpler and more economic than existing steam conditioning valves or the combination of pressure reducing valves and desuperheaters.

8 Claims, 5 Drawing Sheets

STEAM CONDITIONING BUTTERFLY VALVE

BACKGROUND OF THE INVENTION

1. Field of the Invention

The present invention relates to apparatus for reducing pressure and temperature of steam in a steam line. More particularly, the present invention provides a steam conditioning valve for reducing the pressure and degree of superheat of steam in which the valve means includes a butterfly valve having water spray nozzles on its downstream face.

2. Background of the Prior Art

Sub-cooled spray water from a boiler feed pump is generally used in the power and process industry to cool superheated steam to its saturation temperature or to a desired degree of superheat. This is generally achieved by means of a mechanical or steam assisted desuperheater, equipped with either fixed or variable opening nozzles. Combining such a desuperheater with a steam pressure control valve results in a steam conditioning valve which simultaneously reduces pressure and temperature of superheated steam to a predetermined value.

There is a significant difference between a true steam conditioning valve and merely a pressure control valve in series with a desuperheater. In the "combined" steam conditioning valve, spray water injection is an integral part of the steam control valve and the valve is capable of mechanically proportioning the water mass flow as a function of the pressure reducing valve trim position. This direct water proportioning results in a valve which is particularly suitable for applications demanding fast reaction times, frequent load changes, cyclic operation, accurate temperature controls and no accidental overspray.

A spray water control valve is generally used to supply correct inlet pressure to a steam conditioning valve and to fine-tune the water requirements based on downstream steam temperature measurement and a resulting instrument signal from the control loop. By contrast, steam pressure control valves with a desuperheating device downstream of the pressure reducing stage exhibit a much slower response time and have the potential to temporarily over-spray or under-spray. The degree of turbulence which is an important parameter from a mixing point of view is much lower than by injecting in the pressure reducing valve. The overall performance of these systems is frequently less than desirable and can cause operational headaches.

Basic desuperheating valve systems are typically based on a conventional in-line or angle body pressure reducing valve approach. These are normally plug valves in which the spray water is supplied through the valve stem and plug. Although these valves may function quite satisfactorily, simpler and more reliable steam conditioning valves are believed to be possible.

In addition to inaccurate delivery of desuperheating water, other problems which must be avoided in designing a practical steam conditioning valve include operational or maintenance problems due to thermal expansion, such as valve jamming and inadequate sealing.

Accordingly, it is a primary object of the present invention to provide a steam conditioning valve which efficiently combines temperature reduction and pressure reduction capabilities into a single unit.

It is a further object of the present invention to provide such a steam conditioning valve which is as simple and reliable as possible.

It is another object of the present invention to provide such a steam conditioning valve which provides accurate desuperheating while avoiding maintenance problems caused by thermal expansion/contraction, such as valve jamming and inadequate valve sealing.

It is another objective to achieve a maximum Cv for a minimum physical valve size and weight (typical for butterfly valves).

A further objective is to have a control element which is not sensitive to debris in the flow (example: welding rod ends, exfoliation products from superheater piping, welding dirt etc.)

These and other objects of the present invention will become evident from review of the following specification.

SUMMARY OF THE INVENTION

The present invention provides an improved steam conditioning valve which simultaneously reduces pressure and temperature of superheated steam in a steam line.

In the preferred embodiment of the present invention, a butterfly disc-shaped valve member is oriented in a steam line on a rotatable valve shaft. The valve member includes on its downstream face one or more water spray nozzles for supplying desuperheating water upon opening of the valve member. Preferably the water supply nozzles should be elevated and tilted to assure that water is sprayed in a downstream direction throughout the rotation of the valve member.

In the first embodiment illustrated, valving is provided for selectively controlling the flow of water to each of the individual water nozzles. By adjusting this valve means, the delivery of desuperheating water can be proportioned to provide accurate desuperheating of steam, but without the risk of over-spray or underspray. In the second embodiment illustrated, a modified water supply line is illustrated which provides a wider array of water nozzle placement on the face of the valve member. Various options for delivery of water to the nozzles are also described.

The present invention provides an improved steam conditioning valve which is simpler, more reliable, and more economic than existing steam conditioning valves.

DESCRIPTION OF THE DRAWINGS

The operation of the present invention should become apparent from the following description when considered in conjunction with the accompanying drawings, in which.

DETAILED DESCRIPTION OF THE INVENTION

The present invention provides an improved steam conditioning valve 10 for use in any of a variety of steam lines 11, and particularly superheated steam lines requiring desuperheating.

Figure 1:
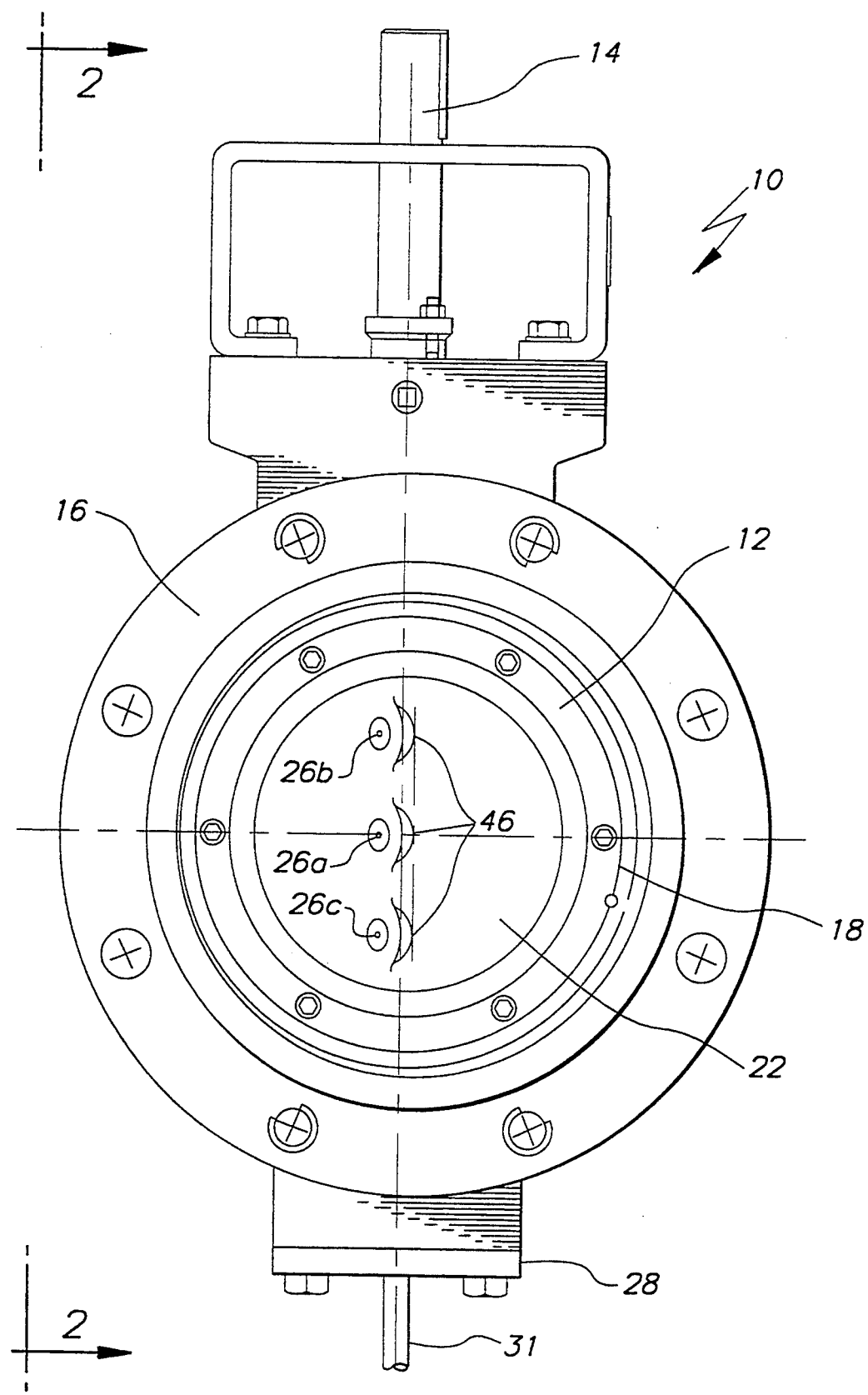
FIG. 1 is an elevational view of a downstream face of a steam conditioning valve of the present invention, with a valve member shown in a closed position.
Figure 2:
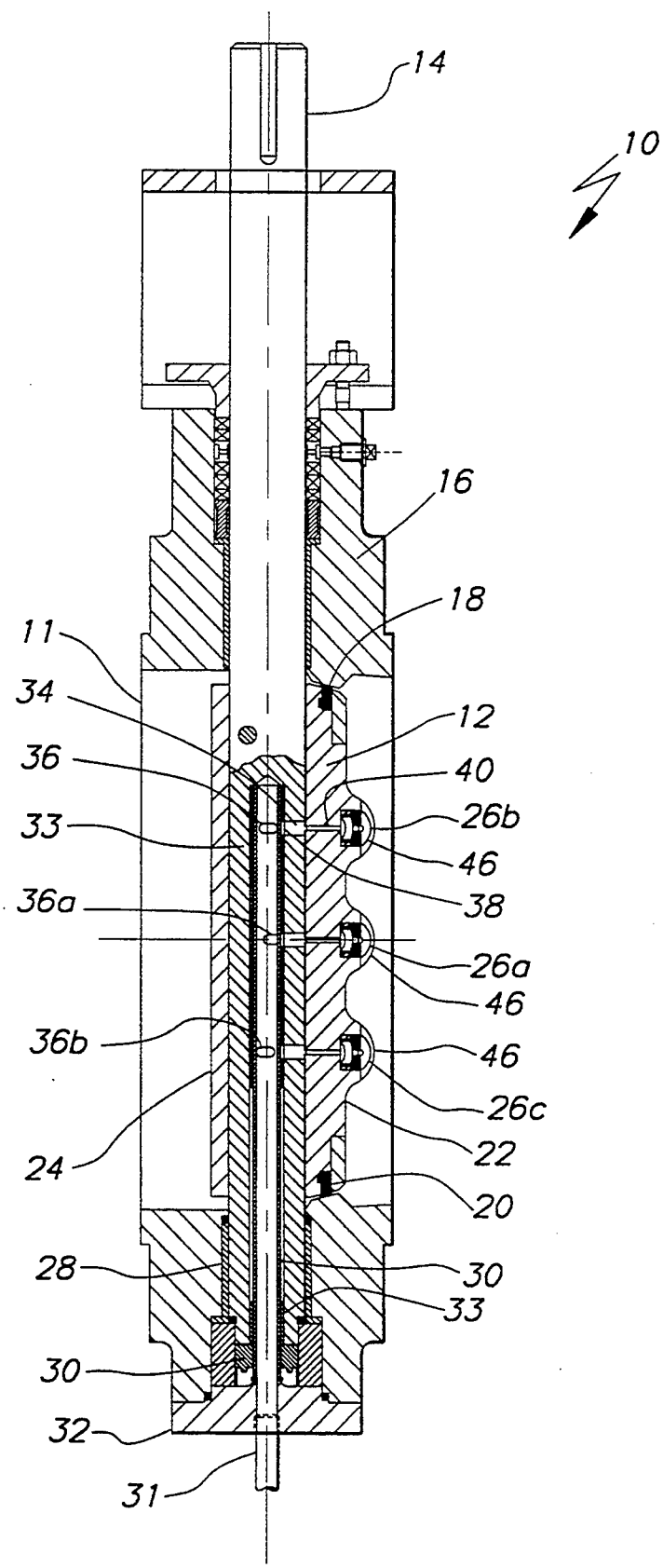
FIG. 2 is a cross-sectional view of the steam conditioning valve of the present invention along line 2—2 of FIG. 1.

As is shown in FIGS. 1 and 2, the steam conditioning valve 10 of the present invention comprises a disc-shaped valve member 12 affixed to a rotating valve shaft 14. The valve member 12 and valve shaft 14 are mounted in a valve body 16. The valve body 16 defines a valve seat 18 against which the valve member 12 seats when in a fully closed position. The valve member should be provided with a seal ring 20 or similar device to assure a pressure tight seal against the valve seat 18 in a closed position.

Figure 3:
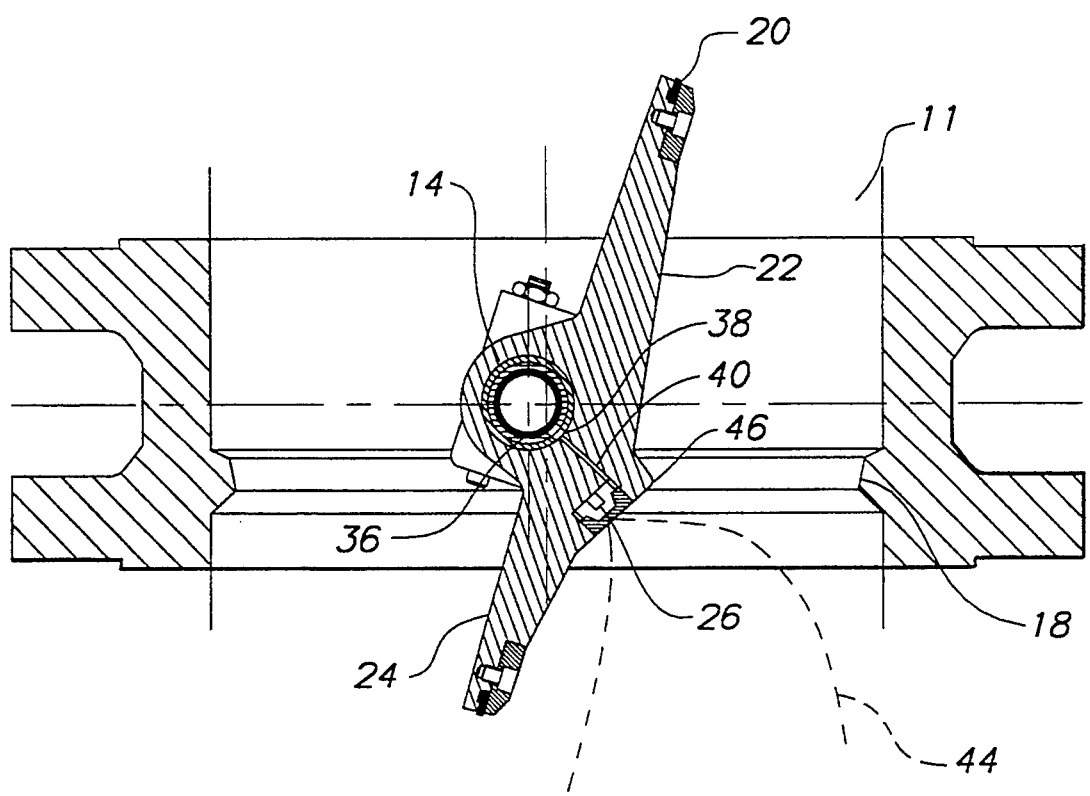
FIG. 3 is a cross-sectional view of the steam conditioning valve of the present invention, with the valve member shown in a partially open position.

The valve member 12 has a downstream face 22 and an upstream face 24. The downstream face 22 of the valve member 12 includes one or more water feed nozzles 26. As is shown in FIGS. 1 through 3 and described below, these nozzles 26 are preferably oriented in a raised position above the downstream face 22 and are angled in a generally downstream position relative to the flow of steam.

The valve shaft 14 is hollowed at a first end 28. A water supply line 30 is provided within the hollowed portion of the shaft 14 and extends through and is welded to a bottom flange 32. The water supply line 30 provides communication of water from a water source 31 to the nozzles 26. In the preferred embodiment shown, the water supply line 30 comprises a tube, constructed from a durable material such as stainless steel or similar material, and a bearing bushing 33 surrounding the tube.

In order to control flow of water from the water supply line 30 to the nozzles 26, valve means 34 are provided. The preferred valve means 34 provides for selective spray through predetermined nozzles 26 and comprises a series of slots 36 in the water supply line 30 (each corresponding with one of the nozzles 26), nozzle feed holes 38 in the bearing bushing 33, and conduits 40, which communicate between each of the feed holes 38 and the nozzles 26.

In operation, the water supply line 30 is positioned in the valve shaft 14 so that the slots 36 are properly oriented with regard to the nozzle feed holes 38 in the bearing bushing 33. The exact position of the bearing bushing 33 within the valve shaft 14 is controlled by pins (not shown) which are used to lock the bushing 33 in a predetermined position in order to achieve proper sequencing of the spray nozzles.

One of the chief advantages of this simple and effective valve means 34 is that it readily provides for the selective opening of the nozzles 26. As is shown in FIG. 2, openings 36, 36a, 36b may be provided at different positions on the water supply line 30 so to provide opening of the nozzles 26 at different intervals as the valve member 12 rotates between an open and closed position. By way of example, in the orientation illustrated, as the valve member 12 rotates towards an open position the middle nozzle 26a sprays first, followed by the upper nozzle 26b and then the lower nozzle 26c.

Preferably the spray nozzles 26 are of a swirl pressure type with a tangential water inlet. Similar nozzles are commercially employed in Yarway Corporation's TEMPLOW ® desuperheaters. The nozzles should be permanently affixed, such as by threading and vacuum brazing them to the valve disc 12.

In operation the valve member 12 is moved from a fully closed position (as shown in FIG. 2) to a fully open position (as shown in FIG. 3) by actuating the valve shaft 14 in any conventional manner presently employed to operate conventional butterfly valves. This may include strictly mechanical, electromechanical, pneumatic, hydraulic, and electronic or computer-driven control systems. As the valve shaft 14 and the valve member 12 pass from a closed position to an open position, each of the openings 36, 36a, 36b will shift into a position to provide communication between the water supply line 30 and each of the nozzles 26 through the water supply conduits 40. As water flow is supplied to each of the nozzles 26, a spray of water 44 is provided into the flow of steam through the steam line 11.

The size and number of nozzles 26 is a function of the total water mass flow required, the water pressure available, the desirable water droplet diameter (and size distribution), and the size of the valve. The larger the disc 12 diameter, the more nozzles can be installed. In the embodiment shown in FIGS. 1 through 3, the size of the disc 12 dictates installing the nozzles 26 in a straight line.

The valve member 12 does not have to open more than approximately 70° to 75° to reach its full flow capacity. In this position all spray nozzles should be operating at maximum load. The nozzles should be tilted on the disc 12 to avoid spraying into the valve seat 18 or directly at the valve body 16 in a fully open position. The nozzles 26 may be oriented at slightly different angles as a function of their opening sequence. In larger sized valves, the start-up (i.e. first opening) nozzle 26 should be tilted 20° in the direction of valve member 12 rotation so to avoid spraying to the valve body 16 when the spray nozzle 26 begins to spray; the slot 36 in the water supply line 30 can be oriented to shut this nozzle completely at about 45° of opening if desirable.

The particular aerodynamics around the butterfly disc valve member 12 creates the required degree of turbulence to mix water droplets with the steam. It is preferred that each of the nozzles 26 is mounted in tilted and elevated projections on "eyes" 46 on the disc member 12. These projections 46 serve to protect the exiting spray of water 44 from direct exposure to the high velocity steam flow and give it time to develop properly. Ideally the exiting spray of water 44 forms a hollow water cone with a spray angle of approximately 60° to 90°.

For improved sealing and more reliable valve operation regardless of thermal expansion, the seal ring 20 should be a flexible laminate of stainless steel and carbon fiber or graphite, such as used on the valve supplied by Vanessa Valve Corporation of Houston, Tex., in connection with their 30,000 Series butterfly valve. Such a flexible laminate will compensate for thermal expansion differences and avoid leakage and jamming problems often encountered with conventional butterfly-type valves.

Figure 4:
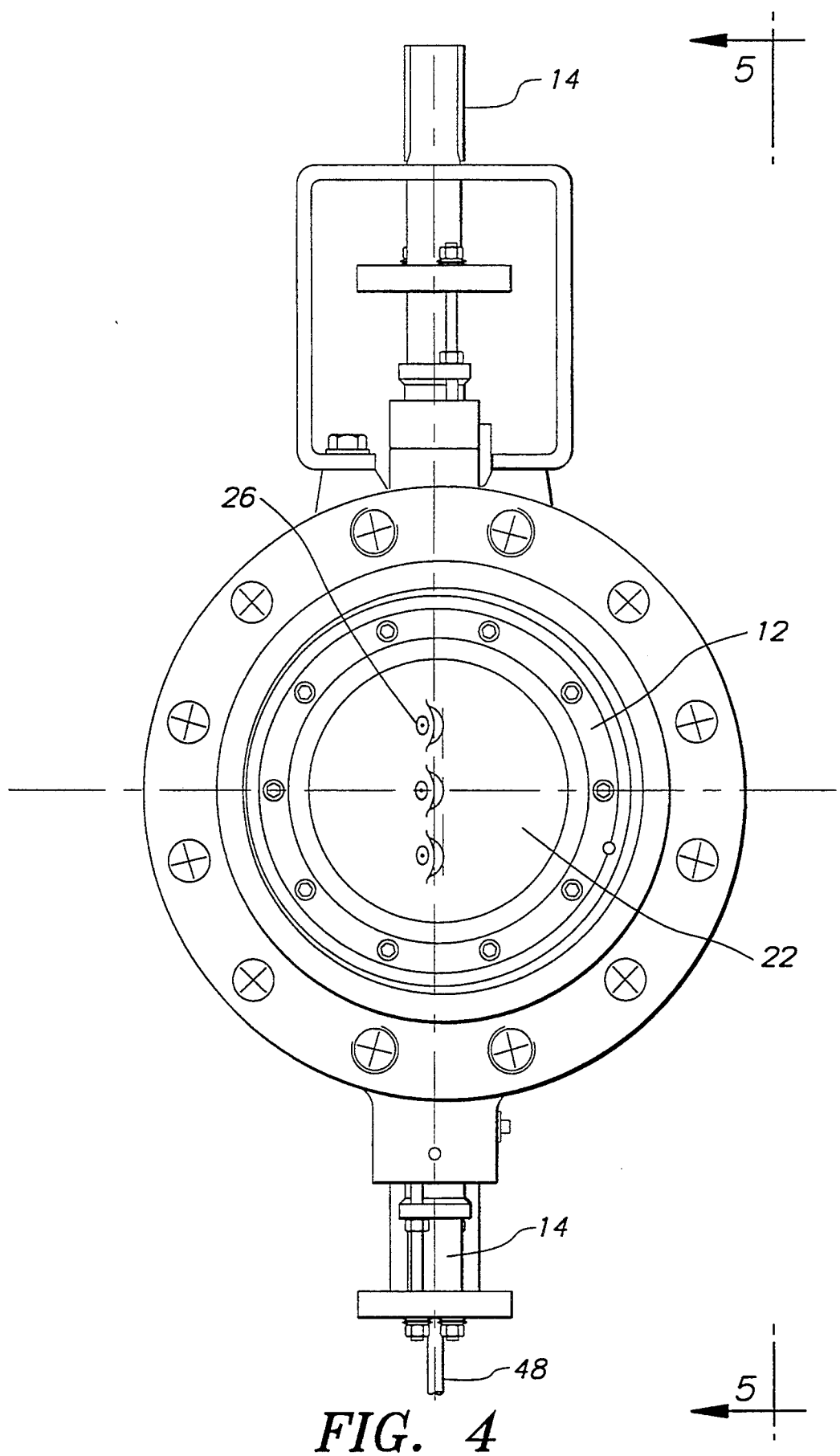
FIG. 4 is an elevational view of a downstream face of another embodiment of a steam conditioning valve of the present invention.
Figure 5:
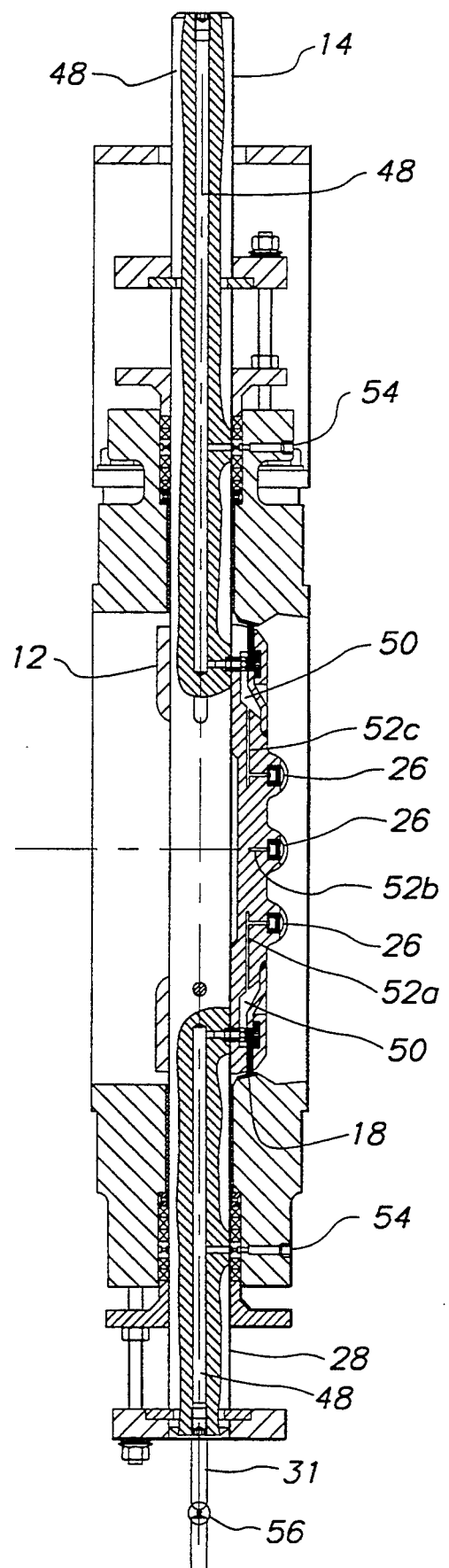
FIG. 5 is a cross-sectional view of the steam conditioning valve of the present invention along line 5—5 of FIG. 4.

Another embodiment of the present invention is shown in FIGS. 4 and 5. Since it is often desirable to provide nozzles in an orientation other than a straight row, in this embodiment the water supply line is modified to permit more diverse placement of the nozzles 26. In this embodiment the valve shaft 14 is hollowed along its first end 28 and along its second end 48. A modified water supply line 48 is provided which may supply water from either or both ends of the valve 10. At the disc valve member 12, the water supply line 48 forms a common channel 50 around the periphery of the disc 12. Each of the nozzles may then be fed by separate water supply conduits 52a, 52b, 52c from the common channel 50 of the water supply line 48.

Without departing from the present invention, it should be appreciated that the water supply line 48 of this or the previous embodiment may be oriented in a variety of ways. First, as is shown in FIG. 2, the water can be supplied only from one of the two ends of the valve shaft 14. Second, as is shown in FIG. 5, water can be supplied from one end of the shaft 14 with a connection at a lower end Serving as a drain, if desired. Third, also as is shown in FIG. 5, water can be supplied from both ends of the shaft 14. This latter form of the present invention permits injecting a maximum of water at the lower possible pressure drop; it is therefore suited for applications with high water mass flow requirements and only very low available pump pressure. Additional water can be fed by providing auxiliary water connections 54, 54 for the water supply line 48. In this case a special ring is required in the stuffing boxes. These connections are normally used as drains.

The use of a periphery channel 50 in the water supply line 48 has a number of distinct advantages. First, as is shown in FIG. 4, the nozzles 26 may be placed in a variety of locations on the downstream face 22 of the valve member 12 without difficult connections between each nozzle and a strictly axial water supply line. Second, the water flow network of this form of the present invention, having two possible water sources and a wider channel feeding each conduit 52, is believed to be more reliable. With the redundancy built into this system, dirt trapped in one water line should not adversely impact the operation of the steam conditioning valve 10 as a whole.

The valve illustrated in FIGS. 4 and 5 does not have individual valve means to control the flow of water to each nozzle 26. Instead, valve means 56 is provided at the water source 31, or along the water supply line 48. This type of valving is not preferred for all applications since all the nozzles will spray simultaneously. Accordingly, there is no sequencing or "split-ranging" of the water supply, no internal mechanical proportioning of the water, and this type of valve may not be employed as a shut-off device to cut-off the water in case of a main water valve failure. It should be appreciated that within the broad scope of the present invention it is contemplated that any known valve means may be substituted for the valve means illustrated in the present application.

As was noted above, although this second embodiment provides more flexibility in nozzle placement, nozzles should still be placed only on the downstream 22 face of the valve member 12. Further, spray should not be directed at the valve seat 18 or at the valve body 16. If nozzles are placed behind each other in large diameter valves, the nozzles may have to spray at different angles to cover the flow section more evenly.

The present invention presents a simple and very economical steam conditioning valve particularly suited for many applications for simultaneously reducing pressure and temperature of superheated steam. Although particular embodiments of the present invention are disclosed herein, it is not intended to limit the invention to such a disclosure and changes and modifications may be incorporated and embodied within the scope of the following claims.

What is claimed is:

1. A steam conditioning valve for use in a steam line to reduce pressure and temperature in a flow of superheated steam by supplying water from a water source including water valve means, which valve comprises a valve body defining a valve seat;

a pivotal disc valve member, including an upstream face and a downstream face, attached to a valve shaft;

the valve shaft rotating the valve member between a fully open position, where the upstream face is substantially parallel to the flow of steam through the steam line, and a fully closed position, where the upstream face is substantially perpendicular to the flow of steam through the steam line, the valve member forming a pressure tight seal against the valve seat when it is in a fully closed position;

the valve member having at least one water feed nozzle in its downstream face for delivering water into the flow of steam when the valve is in at least a partially open position;

wherein water is supplied to the water feed nozzle through a water supply line within the valve shaft, the flow of water from a water source to the water feed nozzle being controlled by water valve means; and said valve member containing a channel in its periphery which is an extension of said water supply line, each of said water supply nozzles being in communication with said channel.

2. The steam conditioning valve of claim 1 wherein the downstream face of the valve member is elevated in the area surrounding the water feed nozzles, projecting the nozzle in a direction downstream of the flow of steam even when the valve member is in a fully open position.

3. The steam conditioning valve of claim 1 wherein the valve means controls flow between the water source and the water supply line.

4. The steam conditioning valve of claim 1 wherein the water valve means comprises a port within the valve shaft providing selective communication between the water supply line and a conduit to the water feed nozzle, said port providing such communication when the valve member has rotated to a position to align the conduit with the port;

wherein the proportions and placement of the port is oriented to open the port at the predetermined position as the valve member pivots from a closed position towards an open position, and to close the port at a predetermined position as the valve member pivots from an open position to a closed position.

5. The steam conditioning valve of claim 4 wherein multiple water supply nozzles are provided in the downstream face of the valve member.

6. The steam conditioning valve of claim 5 wherein each of the water supply nozzles opens at a different position relative to the degree of opening of the valve member.

7. The steam conditioning valve of claim 6 wherein each of the water supply nozzles are positioned in substantially a straight line parallel with the valve shaft.

8. The steam conditioning valve of claim 6 wherein at least one of the water supply nozzles is staggered in a position which is not in line with the remaining nozzles.

* * * * *